(12) United States Patent
Hayden

(10) Patent No.: X3780
(45) Date of Patent: Nov. 26, 1823

(54) OIL, PYROLIGNEOUS & ACID, FOR TANNING

(76) Inventor: m Horace H. Hayden

Horace H. Hayden
Letters Patent

The schedule referred to in these Letters Patent, and making part of the same, containing a description in the words of the said Horace H. Hayden himself of his improvement or discovery in the converting, manufacturing or tanning of raw hides of all kinds into leather, by means of empyreumatic or pyroligneous oil and acid, produced by the distillation of wood and all other vegetable substances —

---

The empyreumatic or pyroligneous oil (or tar) and pyroligneous acid, are obtainable only by the distillation of any or all kinds of wood and other vegetable substances, and in the following or a similar manner viz: The wood or other vegetable substance is put into a vessel or receptacle of proper or suitable dimensions, made of iron, copper or other metal of a cylindrical or other form, having one or two openings as convenience may require viz. If required to distill the empyreumatic or pyroligneous oil (or tar) and acid in the small way, one opening in the vessel intended for the reception of the wood or other vegetable substances, may serve for the purpose of introducing the wood or other vegetable substances, and at the same time, for the reception of a tubular pipe or still worm, which receives and conveys off, the empyreumatic or pyroligneous oil (or tar) and acid, into a common receiver. If required to distill the above mentioned articles in the large way, the vessel into which the wood or other vegetable substances is received, should have an opening in the upper or superior surface, with a door or lid so adapted as when the wood is introduced to admit of being closed up and luted.

— When the cylinder or other formed vessel is filled or otherwise charged with wood or other vegetable substances, it is placed in a furnace constructed of brick or stone, having two or three openings as occasion or convenience may require, per examples— One opening for introducing the wood in order to make a fire for carrying on the distillation — another or a second, for the purpose of conveying away the smoke, and a third on the top of the furnace, corresponding to the opening or door in the metallic cylinder (containing the wood for distillation) for the purpose of introducing the successive supplies of wood or other vegetable substances for distillation. The furnace being thus, or in a
similar manner prepared, a tubulure pipe, or still worm, is adapted to the
opening in the end of the metallic cylinder and luted. As soon as the wood in
the furnace is ignited and the distillation commences, the empyreumatic or
pyroligneous oil (or tar) and acid passes over in a gaseous form through the
tubulure pipe, or still worm (which is immersed in cold water) into a receiver
where it is condensed into the form of the empyreumatic or pyro-ligneous oil
(or tar) and acid. From thence it is taken and used for the purposes of manu-
-facturing raw hides into leather in the following manner.

Mode of using the pyro-ligneous oil and acid in Tanning. In the distillation
of wood or other suitable substances for the purpose of obtaining the empyreu-
-matic or pyro-ligneous oil & acid, the two ingredients pass over into the receiv-
-er nearly together and more or less in combination; hence the pyro-ligneous
acid holds a part of the pyro-ligneous oil (or tar) in solution. When the acid
becomes saturated, the superabundant oil is precipitated to the bottom, in
either of which states they are made subservient to the purposes of manufac-
-turing of raw hides into good and firm leather, and in the following man-
-ner, viz: The pyro-ligneous acid containing the pyro-ligneous oil (or tar)
in solution is decanted or poured off into another vessel, when it is diluted
with water or other proper diluents, in a suitable proportion; say equal parts of
water, and the acid and oil in solution; or if the acid is strong it may re-
-quire three parts of water to one of the acid and oil in combination: at any
rate the quantity of water or other diluent should be in quantity sufficient
to prevent the acid from injuring the animal fibre of the hides, which it
sometimes will do, if too strong. In this mixture the hides, after being depri-
-ved of the hair in the usual manner, by liming are to be immersed and
there retained Twenty or Thirty-six hours, or until the principal part of the
oil contained in the mixture appears to be taken up by the hides, which
may be known, in part, by the liquor becoming less turbid or almost clear.
If the hides are not sufficiently charged with the empyreumatic or pyro-lig-
-neous oil, which constitutes the essential principle in converting raw hides
into leather, they must be subjected to a second mixture of the same
kind and for the same time, or longer if necessary, observing however that, in order to a speedy and successful result, the vessels or vats contain-
-ing the mixture and hides, should be exposed to nearly an equal tempe-
-rature of from 70 to 75 or 80 degrees of heat of Farenheits thermometer.
When the hides are sufficiently saturated with the mixture to render them
into leather, they are taken out, dried, and treated as in the ordinary pro-
-cess of treating hides, after having undergone the tanning process. viz. in
rubbing, currying, oiling, staining &c. for the different uses to which it is
to be applied. The empyreumatic or pyro-ligneous oil (or tar) which may
be precipitated to the bottom of the receiver, in the distillation, and not held
in solution in acid, is rendered subservient to the purposes of tanning or
converting raw hides into leather by being combined with a suitable pro-
-portion of the pyro-ligneous acid, as before, and water or other liquids, into
which the raw hides are immersed, and treated as above.
What I claim as my peculiar discovery, improvement or invention, and
for which I claim a patent, is the exclusive privilege of using, or causing to
be used, the empyreumatic or pyro-ligneous oil (or tar) and acid, obtained
in whatsoever mode or manner by the distillation of wood or other vege-
-table substances; which oil and acid, when properly proportioned is used
for the purpose of converting or manufacturing raw hides into leather.
Witnesses
Wm Elliot
William P. Elliot Horace H. Hayden

[illegible]